(12) United States Patent　　(10) Patent No.:　　US 8,047,366 B2
Nakagawa et al.　　　　　　　　(45) Date of Patent:　　　　Nov. 1, 2011

(54) CONNECTED FASTENER ASSEMBLY

(75) Inventors: Yasushi Nakagawa, Chuo-ku (JP);
Hiroki Yamamoto, Chuo-ku (JP);
Takamichi Hoshino, Chuo-ku (JP);
Kazuhisa Takeuchi, Chuo-ku (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 13/041,750

(22) Filed: Mar. 7, 2011

(65) Prior Publication Data

US 2011/0158770 A1　　Jun. 30, 2011

Related U.S. Application Data

(62) Division of application No. 12/265,481, filed on Nov. 5, 2008, now Pat. No. 7,963,393.

(30) Foreign Application Priority Data

Nov. 6, 2007　(JP) ................................. 2007-288919
Nov. 6, 2007　(JP) ................................. 2007-288921

(51) Int. Cl.
*B65D 85/24*　(2006.01)
(52) U.S. Cl. .......................... 206/343; 206/347; 411/443
(58) Field of Classification Search .................. 206/338, 206/343–347, 720; 411/442, 443
See application file for complete search history.

(56) References Cited

U.S. PATENT DOCUMENTS

| | | | |
|---|---|---|---|
| 3,841,474 A | 10/1974 | Maier | |
| 4,684,022 A | 8/1987 | Potucek | |
| 4,881,643 A * | 11/1989 | Pfister | ............................ 206/343 |
| 4,930,630 A | 6/1990 | Habermehl | |
| 6,779,959 B1 * | 8/2004 | Yang | ............................... 411/443 |
| 6,811,366 B2 | 11/2004 | Chen | |
| 7,021,462 B2 * | 4/2006 | Powers et al. | ................. 206/343 |
| 2004/0118720 A1 | 6/2004 | Powers et al. | |
| 2007/0278119 A1 * | 12/2007 | Gaudron | ........................ 206/347 |
| 2008/0029414 A1 * | 2/2008 | Uejima et al. | ................. 206/345 |

FOREIGN PATENT DOCUMENTS

| | | |
|---|---|---|
| EP | 0 053 828 A1 | 6/1982 |
| JP | 54-164350 | 11/1979 |
| JP | 55-18625 | 2/1980 |
| JP | 57-120713 | 7/1982 |
| JP | 57-136010 | 8/1982 |
| JP | 63-126609 | 8/1988 |

(Continued)

*Primary Examiner* — Luan Bui
(74) *Attorney, Agent, or Firm* — Drinker Biddle & Reath LLP

(57) ABSTRACT

A connected fastener assembly is formed by fitting a shaft guide on a shaft section of each fastener, by connecting the fasteners using two connecting sheets made of a synthetic resin and disposed on upper and lower sides of the shaft guides. Since the connecting sheets have through holes thorough which the fasteners pass and connecting sections formed so as to be easy to bend or difficult to bend in the width direction, the connected fastener assembly can be formed into a straight type or a coil type.
In a connected fastener assembly, shaft sections of a plurality of fasteners are connected by a connecting band formed of a thin sheet of a synthetic resin. Ring-shaped retaining sections for retaining the shaft sections are formed at constant intervals in the connecting bands. The ring-shaped retaining sections are disposed so as to be overlaid on shaft guides made of soft materials and fitted on the shaft sections. Each of the shaft guides is formed into a cylindrical shape. An outside diameter of each of the ring-shaped retaining sections of the connecting band is larger than an outside diameter of the each of the shaft guides.

3 Claims, 21 Drawing Sheets

FOREIGN PATENT DOCUMENTS

| | | |
|---|---|---|
| JP | 03-009107 | 1/1991 |
| JP | 6-35623 | 5/1994 |
| JP | 2588812 | 5/1996 |
| JP | 2526455 | 11/1996 |
| JP | 2000-240622 | 9/2000 |
| JP | 2003-301824 | 10/2003 |
| JP | 2005-90723 | 4/2005 |
| JP | 2006-070939 | 3/2006 |
| WO | WO 2005/028160 A2 | 3/2005 |
| WO | WO 2008/001725 A1 | 1/2008 |

* cited by examiner

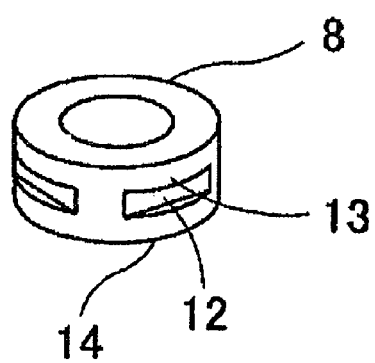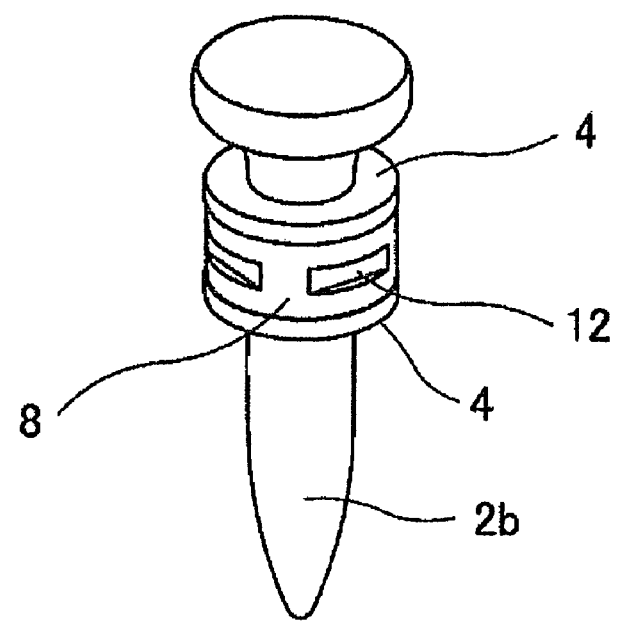
FIG.20(b)
FIG.20(a)

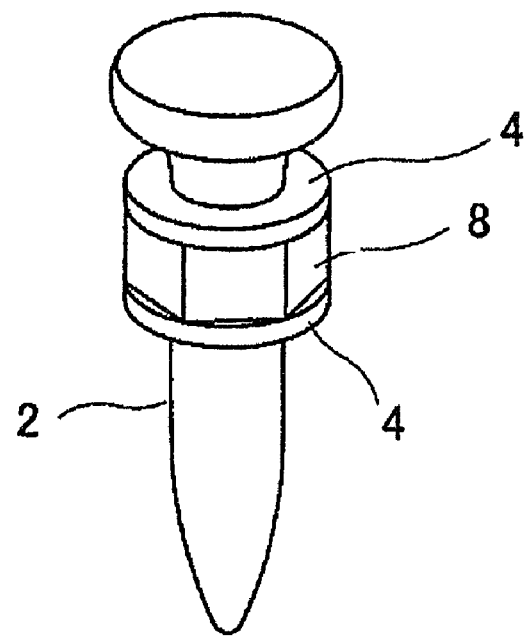
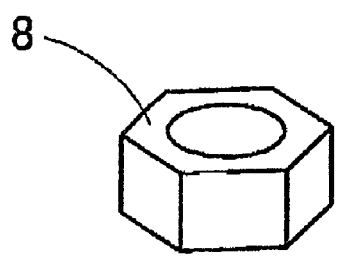

CONNECTED FASTENER ASSEMBLY

This is a divisional application of application Ser. No. 12/265,481, filed on Nov. 5, 2008, now U.S. Pat. No. 7,963,393, which is incorporated by reference herein in its entirety.

TECHNICAL FIELD

The present invention relates to a connected fastener assembly for use in a fastener driving tool powered by pneumatic pressure, fuel gas, etc.

BACKGROUND ART

A fastener driving tool for driving fasteners, such as nails, drive screws, is a tool in which a connected fastener assembly formed of multiple connected fasteners is stored in a magazine and used so that the fasteners are driven continuously into workpieces.

Conventionally, as the connection configuration of the above-mentioned connected fastener assembly, for example, a straight type in which the fasteners are connected straight, a type in which the fasteners are connected and formed into a step-like shape and a coil type in which the fasteners are connected and wound into a coil are known.

Moreover, fasteners used to anchor wood to wood, to fasten liners or wood to concrete, to secure I-beams to thin steel sheets and to fasten denz glass (a plaster board-like material) to studs are usually connected to one another and loaded into a fastener driving tool. As methods for connecting fasteners to form a connected fastener assembly, various methods are known: for example, a stick type connecting method in which multiple fasteners are integrally connected to a straight connecting band made of a synthetic resin, a wire connecting method in which the shaft sections of fasteners are connected using two parallel metal wires by welding, and the so-called plastic sheet connecting method in which retaining pieces provided at constant intervals are bent in the same direction so as to protrude from the upper and lower ends of a connecting band made of a synthetic resin and having a thin sheet shape and fasteners are inserted into the upper and lower retaining pieces. As an example of the synthetic resin connecting method, the method disclosed in Patent documents 1 and 4 are known. In addition, as an example of the plastic sheet connecting method, the method disclosed in Patent documents 2 and 5 are known. Furthermore, a method in which fasteners are connected using a connecting sheet made of a synthetic resin is also known. This connecting sheet comprises shaft guides for allowing the shaft sections of fasteners to be passed through and retained and connecting sections for connecting adjacent shaft guides (refer to Patent documents 6 and 7).

Furthermore, as fastener connecting means, connecting means having a configuration in which the upper and lower portions of a carrier having a complicated shape such that a breakable upper portion is provided in the upper portion of a cylindrical section into which the shaft section of a fastener is inserted are connected using a bridge is also known (refer to Patent document 3).

Since fasteners are often driven continuously in actual processing, it is preferable that a connected fastener assembly should be configured so that a large quantity of fasteners can be loaded into a fastener driving tool at a time. In this respect, connected fastener assembly according to the wire connecting method for winding into a coil or the plastic sheet connecting method are used advantageously. However, in the case of the connected fastener assembly according to the wire connecting method, wires are scattered at the time of driving, whereby there is a danger of striking and injuring human bodies and garbage is produced. Furthermore, the shaft sections of the fasteners are welded to wires in this method. In the case that the fasteners are hardened nails, for example, the strength thereof is lowered at the welded portions by heat during welding. Therefore, when such nails are driven into high-strength concrete or the like, the nails are likely to buckle or fracture. Moreover, if the connected fastener assembly wound into a coil is dropped to the floor or ground inadvertently when the connected fastener assembly is loaded into the magazine of a fastener driving tool, the exterior of the coil may be deformed. If the exterior is deformed, it is difficult to restore the coil into its original shape. Besides, when the connected fastener assembly wound into a coil is carried, a finger is inserted into the center hollow portion of the coil. In this case, there is a danger that the finger is injured by the tip ends of the wires.

On the other hand, in the case of the connected fastener assembly according to the plastic sheet connecting method, each fastener is detached from the connecting band and driven at the time of driving. It is thus necessary to form an ejection hole for ejecting the connecting band remaining in the nose section of a fastener driving tool. Hence, the strength of the nose section lowers, and the connecting band becomes garbage and must be thrown away.

Furthermore, the connected fastener assembly obtained according to the method disclosed in Patent documents 6 and 4 in which fasteners are connected using a connecting sheet made of a synthetic resin is simple in structure. However, since the connecting band thereof is basically formed of a sheet material made of a synthetic resin, the strength of the ring-shaped retaining sections for allowing the shafts of the fasteners to be inserted is not very high. Hence, when the first fastener of the connected fastener assembly is fed into the injection section (the nose section) of a fastener driving tool and is impacted by its driver, the fastener may tilt inside the injection section. When this problem occurs, it is impossible for the ring-shaped retaining section to properly control the attitude of the fastener so that the fastener does not tilt.

[Patent document 1] Japanese Patent Application Laid-Open Publication No. 2003-301824
[Patent document 2] Japanese Patent Application Laid-Open Publication No. 2000-240622
[Patent document 3] Japanese Patent No. 2588812
[Patent document 4] Japanese Patent Application Laid-Open Publication No. Sho 57-120713
[Patent document 5] Japanese Utility Model No. 2526455
[Patent document 6] Japanese Patent Application Laid-Open Publication No. 2005-90723
[Patent document 7] Japanese Utility Model Application Laid-Open Publication No. Hei 6-35623

However, the above-mentioned connection methods have problems. For example, in the case of the connected fastener assembly according to the wire connecting method, since the distance between the two wires is fixed, fasteners having short shafts cannot be connected. Furthermore, since the wires are apt to be deformed relatively easily, there is a problem of shaft tangling in which the tip ends of the shafts of adjacent fasteners are tangled with one another.

Moreover, in the case of the connected fastener assembly according to the synthetic resin connection method, since the connecting band has a complicated shape, there is a problem in which the connecting band breaks due to impact repeatedly applied at the time of fastener driving.

Besides, even in the case of the connected fastener assembly according to the plastic sheet connecting method, since the distance between the upper and lower retaining pieces is constant, short fasteners cannot be connected.

Additionally, since the connecting means disclosed in Patent document 3 is complicated in shape as a whole and can be produced only by extrusion molding, there is a problem of high cost.

Still further, there are problems with respect to the connection configuration. In the case of a fastener driving tool equipped with a straight magazine, only straight-type connected fastener assemblies can be used, but coil-type connected fastener assemblies cannot be used. Conversely, in the case of a fastener driving tool equipped with a cylindrical magazine, only coil-type connected fastener assemblies can be used, but straight-type connected fastener assemblies cannot be used. Hence, connected fastener assemblies conforming to the type of a fastener driving tool to be used must be supplied thereto. As a result, since different types of connection facilities are required depending on the connection configuration of fasteners, the volume of production is dispersed, the operation rates of the connection facilities are reduced, and the production cost cannot be reduced.

In addition, in the case that the outside diameter of the shaft guide is the same as that of the ring-shaped retaining section, when a connected fastener assembly having this configuration is stored in a storage box or loaded into a fastener driving tool, the connected fastener assembly is wound into a coil as a whole and the coil is grasped and lifted by hand. At this time, a phenomenon may occur in which the center side portion of the coil cannot be held with the outer circumferential side portion thereof, and the center side portion drops due to its own weight. If this phenomenon of center side dropping occurs, the coil hangs down loosely as a whole, and the connected fastener assembly must be rewound. This rewinding is troublesome and takes a long work time.

DISCLOSURE OF THE INVENTION

The present invention provides an innovative connected fastener assembly capable of immediately solving problems, such as shaft tangling, connecting band breakage, failure to adaptation to fasteners having short shafts, associated with the connecting method and the connection configuration of fasteners and capable of being produced at low cost by connecting fasteners using cylindrical shaft guides and band-shaped connecting sheets made of synthetic resins.

Furthermore, the present invention provides an innovative connected fastener assembly which shaft guides properly control an attitude of a fastener by fitting each of the shaft guides on around a shaft of the fastener and which the connected fastener assembly formed into a coil can be lifted without causing dropping at a center side of the coil.

According to a first aspect of the invention, a connected fastener assembly is provided with: a plurality of fasteners, cylindrical shaft guides fitted on shaft sections of the respective fasteners and two connecting sheets made of synthetic resins, wherein a first connecting sheet is disposed on an upper side of the shaft guides and a second connecting sheet is disposed on a lower sides of the shaft guides.

According to a second aspect of the invention, the connecting sheets may have through holes through which the fasteners pass and connecting sections which are connecting adjacent though holes and formed so as not to bend in the width direction.

According to a third aspect of the invention, the connecting sheets may have through holes through which the fasteners pass and connecting sections which are connecting adjacent though holes and formed so as to bend in the width direction.

According to a fourth aspect of the invention, a connected fastener assembly is provided with: a plurality of fasteners, cylindrical shaft guides fitted on shaft sections of the respective fasteners, a connecting band formed of a thin sheet of a synthetic resin and connecting the shaft sections to each other and ring-shaped retaining sections formed at constant intervals in the connecting band, wherein the ring-shaped retaining sections are disposed and overlaid on the shaft guides to retaining the shaft sections, and an outside diameter of each of the ring-shaped retaining sections of the connecting band is larger than an outside diameter of each of the shaft guides.

According to a fifth aspect of the invention, a connected fastener assembly is provided with: a plurality of fasteners, cylindrical shaft guides fitted on shaft sections of the respective fasteners, a connecting band formed of a thin sheet of a synthetic resin and connecting the shaft sections to each other and ring-shaped retaining sections formed at constant intervals in the connecting band, wherein the ring-shaped retaining sections are disposed and overlaid on the shaft guides to retaining the shaft sections, an outside diameter of each of the ring-shaped retaining sections of the connecting band is approximately the same as an outside diameter of each of the shaft guides, and wherein the each of shaft guides includes engaging grooves formed on an outer circumferential face of the each of the shaft guides in the circumferential direction.

According to a sixth aspect of the invention, a connected fastener assembly is provided with: a plurality of fasteners, cylindrical shaft guides fitted on shaft sections of the respective fasteners, a connecting band formed of a thin sheet of a synthetic resin and connecting the shaft sections to each other and ring-shaped retaining sections formed at constant intervals in the connecting band, wherein the ring-shaped retaining sections are disposed and overlaid on the shaft guides to retaining the shaft sections, an outside diameter of each of the ring-shaped retaining sections of the connecting band is approximately the same as an outside diameter of each of the shaft guides, and wherein an extending fringe protruding outward is formed on an outer circumferential face of the shaft guides.

According to a seventh aspect of the invention, a connected fastener assembly is provided with: a plurality of fasteners, shaft guides made of soft materials and fitted on shaft sections of the respective fasteners, a connecting band formed of a thin sheet of a synthetic resin and connecting the shaft sections of the plurality of fasteners to each other ring-shaped retaining sections formed at constant intervals in the connecting band and wherein each of shaft guides includes at least three protrusions formed on an outer circumferential face of the each of the shaft guides and protruding in a circumferential direction of the each of the shaft guides and wherein the ring-shaped retaining sections are disposed and overlaid on the shaft guides to retaining the shaft sections of the fasteners, and an outside diameter of each of the ring-shaped retaining sections of the connecting band is smaller than an outside diameter of each of the shaft guides having the protrusions.

Other aspects and advantages of the invention will be apparent from the following description, the drawings and the claims.

BRIEF DESCRIPTION OF THE DRAWINGS

FIG. 20(a) is a perspective view showing a fastener and FIG. 20(b) is a perspective view showing a shaft guide according to yet still another embodiment.

FIG. 25(a) is a perspective view showing a fastener and FIG. 25(b) is a perspective view showing a shaft guide according to a still further embodiment.

EXPLANATIONS OF NUMERALS

Figure 1:
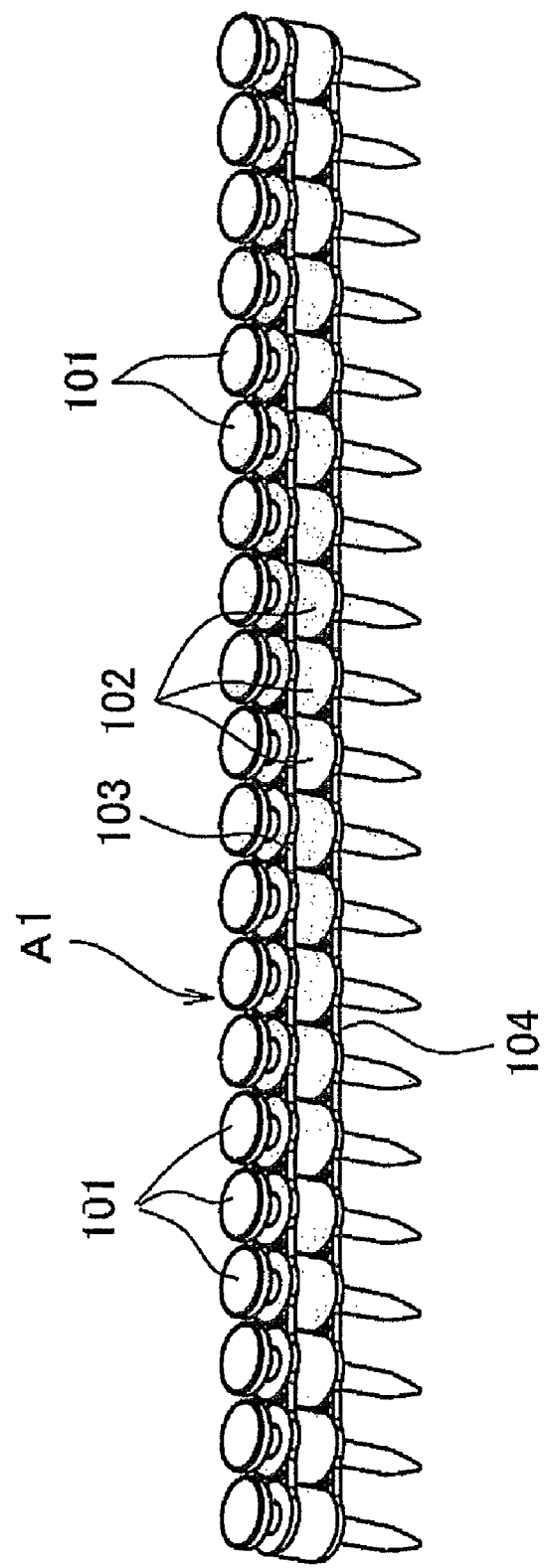
FIG. 1 is a perspective view showing a connected fastener assembly according to an embodiment of the present invention.
Figure 2:
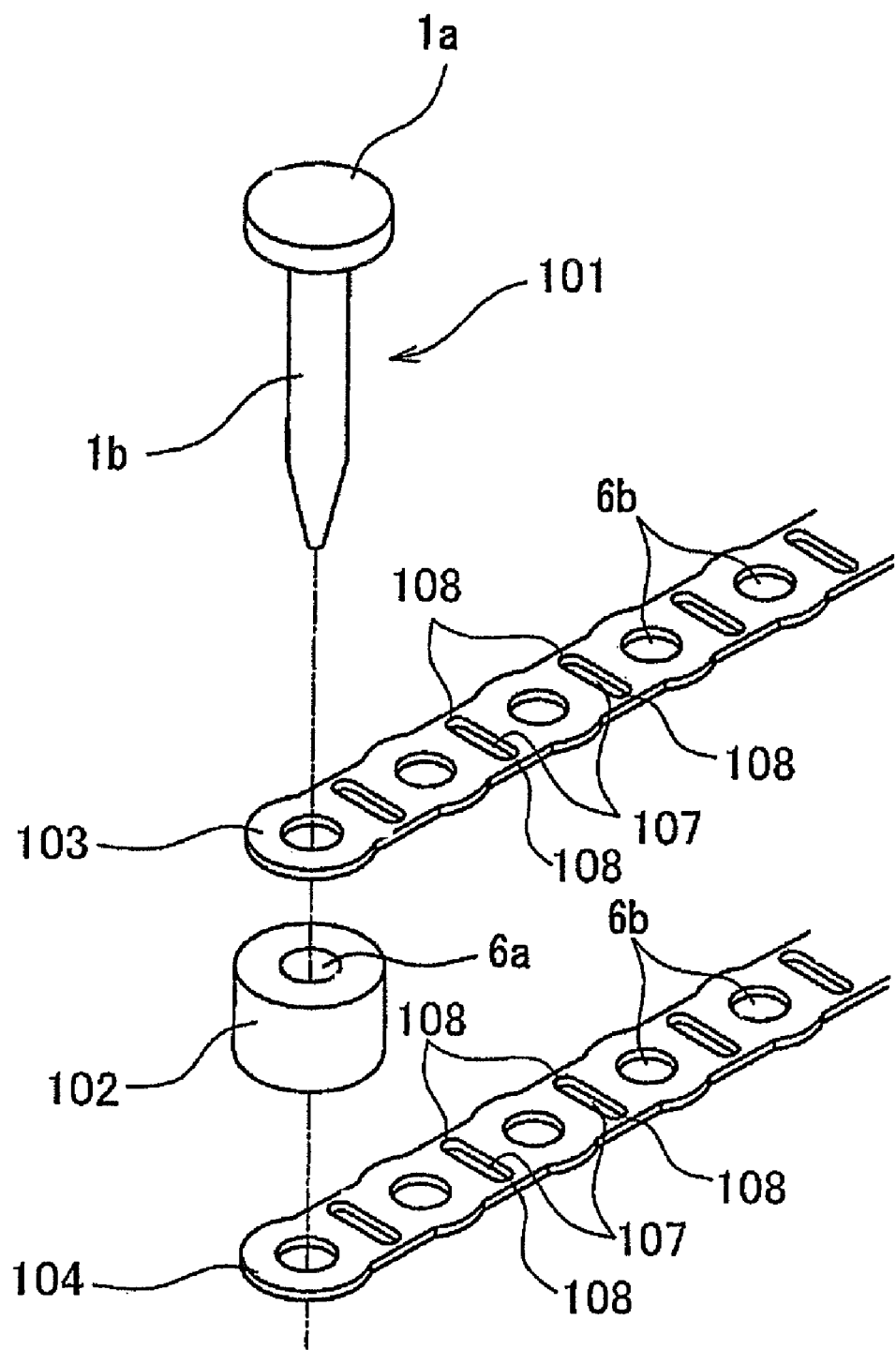
FIG. 2 is an exploded perspective view showing part of the connected fastener assembly.
Figure 3:
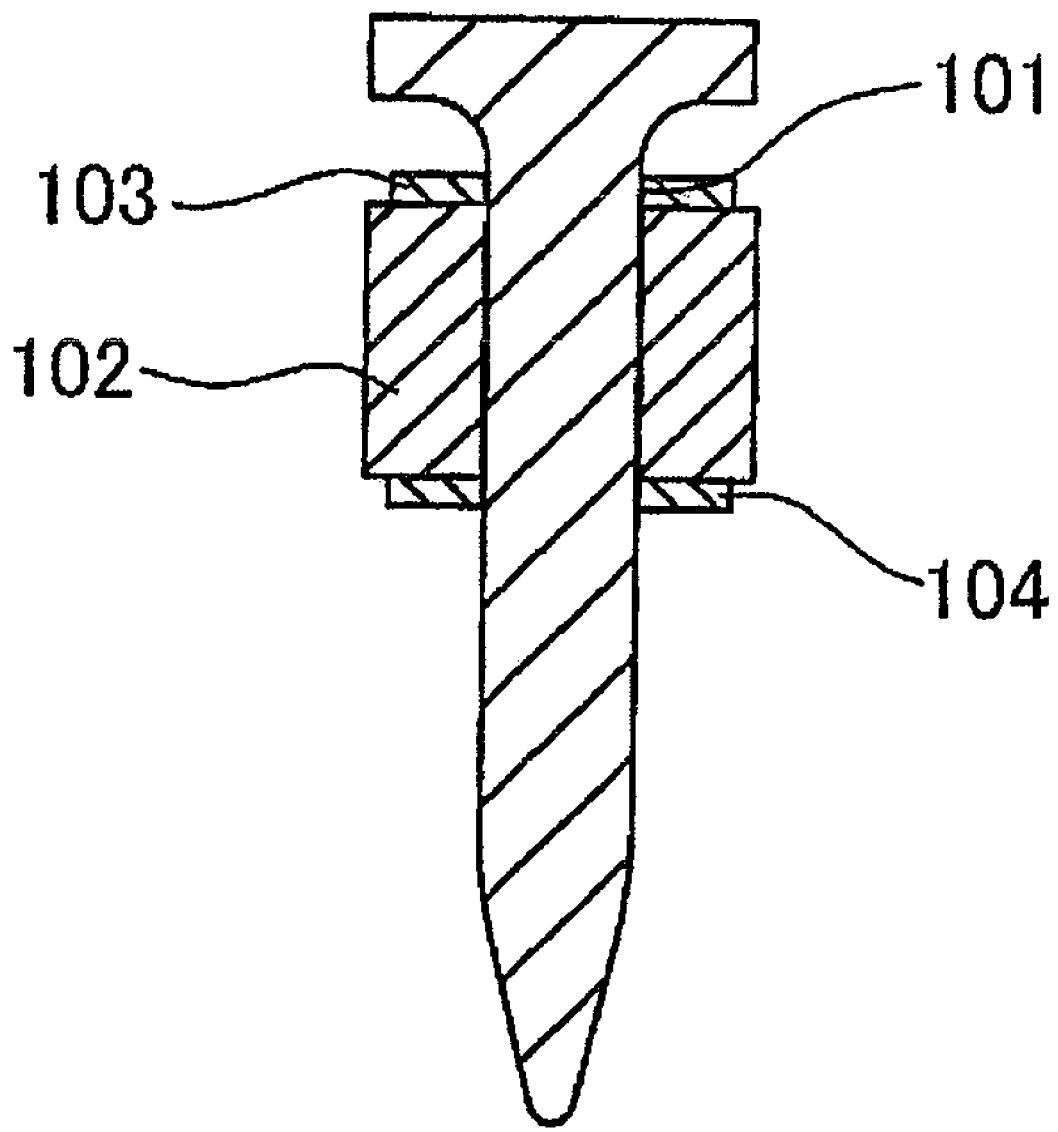
FIG. 3 is a vertical sectional view showing part of the connected fastener assembly.

A1, A2 connected fastener assemblies
101 fastener
102 shaft guide
103, 104 connecting sheets
6a, 6b through holes
108 connecting section
1 connected fastener assembly
2 fastener
3 connecting band
4 ring-shaped retaining section
8 shaft guide

BEST MODE FOR CARRYING OUT THE INVENTION

Embodiments according to the present invention will be described below on the basis of appended drawings.

In FIG. 1, reference code A1 designates a connected fastener assembly. This connected fastener assembly is formed by fitting a cylindrical shaft guide 102 on the shaft section of each of fasteners 101 and by connecting these fasteners using band-shaped connecting sheets 103 and 104 made of a synthetic resin. The connecting sheet 103 is disposed on an upper side of the shaft guides 102 and the connecting sheet 104 is disposed on a lower side of the shaft guides 102.

Figure 4:
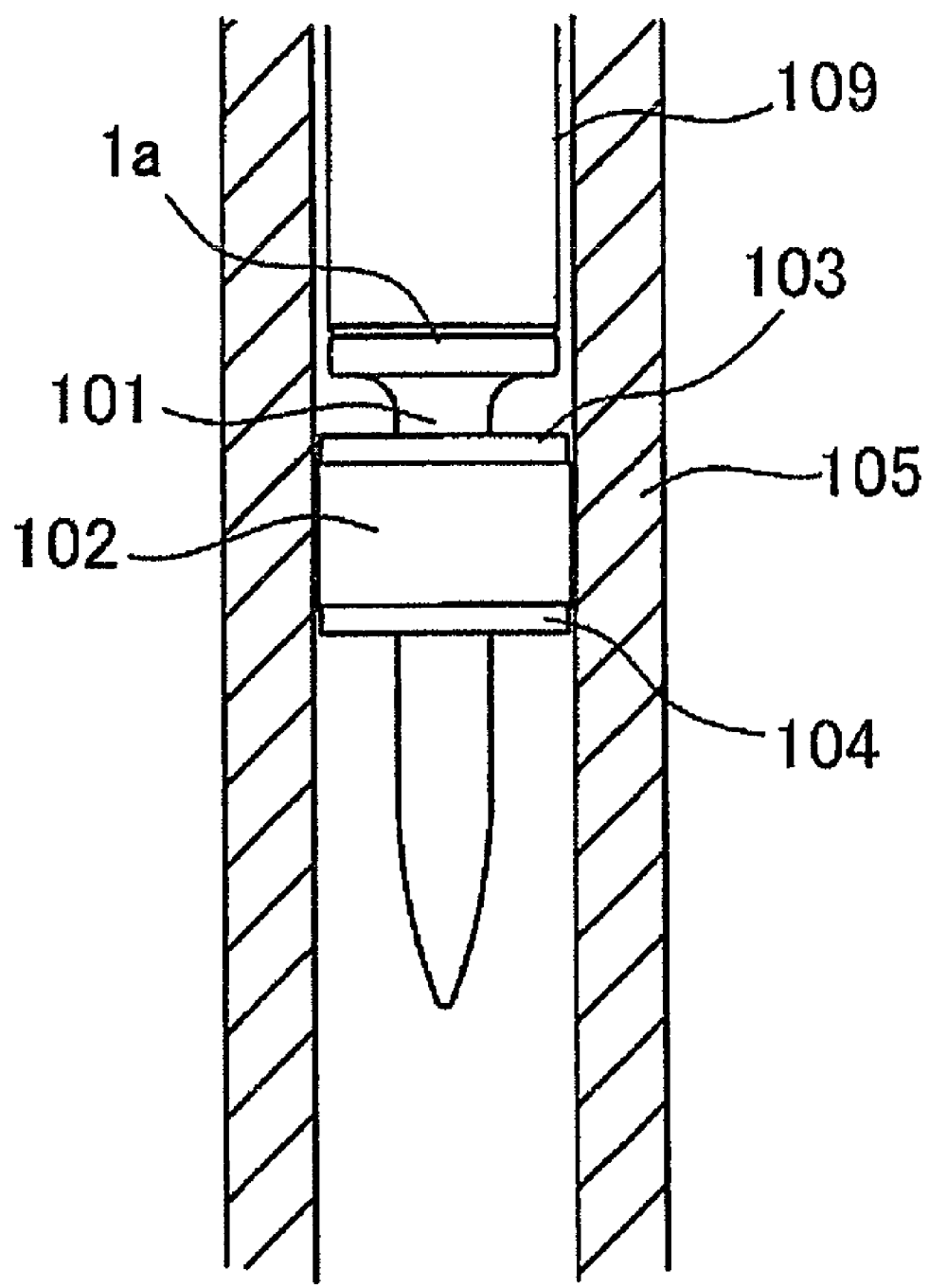
FIG. 4 is a sectional view showing a state in which the first fastener of the connected fastener assembly has been fed into the nose section of a fastener driving tool.

The shaft guide 102 is made of a synthetic resin, such as polypropylene or polyethylene, or aluminum, and is formed such that its outside diameter is approximately the same as or slightly smaller than the diameter of the head section 1a of the fastener 101 and is slightly smaller than the inside diameter of an injection nose section 105 provided at the tip end of a fastener driving tool as shown in FIG. 4. With this configuration, when the fastener 101 reaches the injection nose section of the fastener driving tool or the like and is driven using the driver 109 thereof, the attitude of the fastener 101 is controlled so as to be parallel with the axis of the nose section using the shaft guide 102. A material which does not scatter at the time of driving is selected as the material of the shaft guide 102.

The connecting sheets 103 and 104 are thin band-shaped sheets made of synthetic resins, and through holes 6b approximately as large as the through holes 6a of the shaft guide 102 are formed at equal intervals in the connecting sheets 103 and 104. In addition, a slit-shaped slot 107 is formed between the through holes 6b. Connecting sections 108 are formed at both ends the slot 107, one connecting section at each end, in the width direction of the connecting sheets 103 and 104. With this configuration, the connecting sheets 103 and 104 have a structure which does not bend in the width direction thereof.

When the fasteners 101 are connected, the through holes 6b of the connecting sheets 103 and 104 are aligned with the through holes 6a of the shaft guides 102, and the shaft sections 1b of the fasteners 101 are press-fitted into the through holes 6a and 6b. Hence, the fasteners 101 are connected in a straight line via the connecting sheets 103 and 104. The slot 107 and the connecting sections 108 are disposed between the adjacent fasteners 101. Furthermore, since the connecting sheet 103 is disposed on an upper side of the shaft guides 102 and the connecting sheet 104 is disposed on a lower side of the shaft guides 102, sufficiently high connection strength is obtained securely. In addition, since the connecting sheets 103 and 104 have a structure which does not bend in the width direction thereof, the connected fastener assembly A1 is formed into a straight-type connected fastener assembly (also referred to as a stick type).

Figure 5:
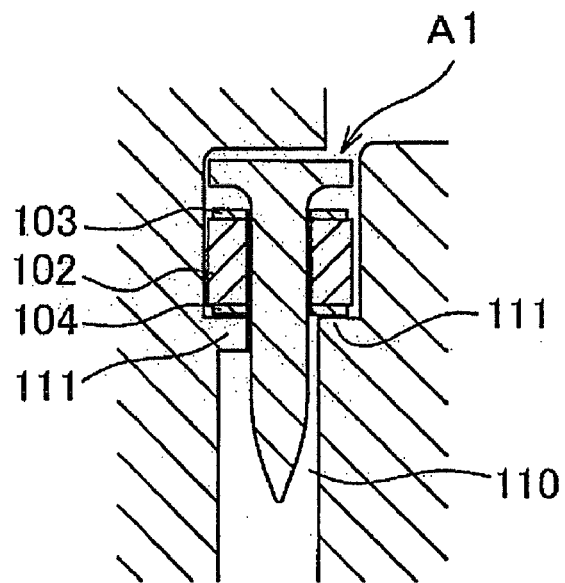
FIG. 5 is a sectional view showing the connected fastener assembly loaded into the fastener feeding passage of the magazine of the fastener driving tool.

Next, when the connected fastener assembly A1 configured as described above is used, the connected fastener assembly A1 is loaded into the straight-shaped magazine of a fastener driving tool. At this time, step sections 111 are formed so as to be opposed to each other on both side walls of the fastener feeding passage 110 of the magazine, and the lower face of the shaft guide 102 of the connected fastener assembly A1 is supported using the step sections 111 as shown in FIG. 5.

Figure 6:
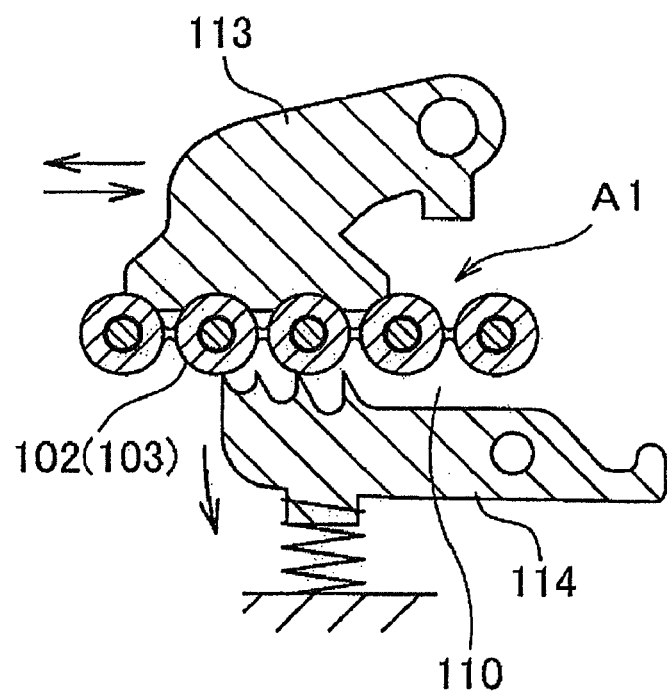
FIG. 6 is a sectional view showing a feeding mechanism in the fastener feeding passage.
Figure 7A:
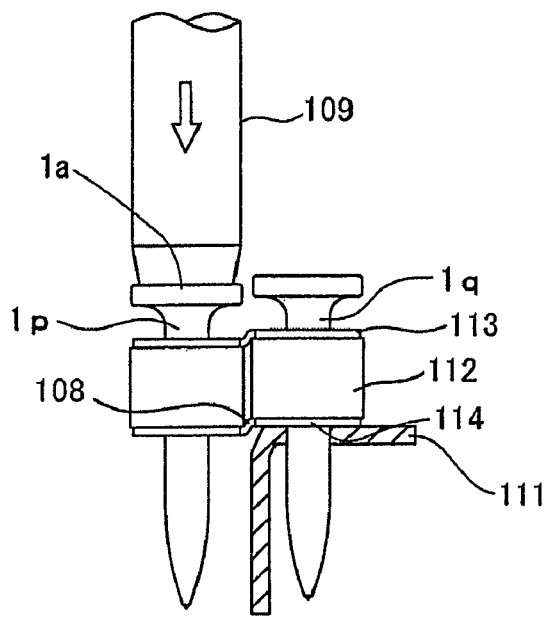
FIGS. 7(a) and 7(b) are explanatory views showing a state in which the first fastener in the nose section is driven and separated from the second fastener.
Figure 7B:
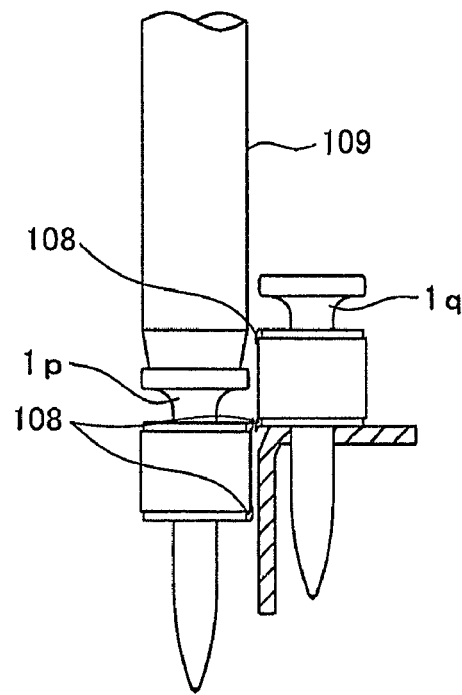

Furthermore, as shown in FIG. 6, a feeding pawl 113 and a check pawl 114 are disposed between both the side walls so as to be able to protrude. To feed the connected fastener assembly A1, the feeding pawl 113 is moved forward and backward using a feeding apparatus not shown. When moved forward, the feeding pawl 113 engages the shaft guides 102 of the connected fastener assembly A1 and feeds the connected fastener assembly A1 by one fastener. When moved backward, the feeding pawl 113 retracts from the fastener feeding passage 110. At the same time, the check pawl 114 enters the fastener feeding passage 110 and engages the shaft guides 102 to prevent the connected fastener assembly A1 from moving backward. In this way, the connected fastener assembly A1 is fed sequentially beginning with the first fastener 101 from the tip end of the magazine to the injection nose section 105 of the fastener driving tool. Since the shaft guide 102 of the first fastener 101 is formed such that its diameter is approximately the same as the inside diameter of the nose section 105 as shown in FIG. 4, the shaft guide 102 is held stably inside the nose section 105, whereby the shaft section of the fastener 101 is also held in the axial direction of the nose section 105. In this state, the fastener driving tool is started, and the driver 109 is driven so that its tip end impacts the head section 1a of the fastener 101, whereby the fastener 101 is moved downward as shown in FIGS. 7(a) and 7(b). At this time, although the connecting sheets 103 and 104 for connecting the first fastener 1p to the second fastener 1q of the connected fastener assembly A1 are also pulled downward, since the second fastener 1q is stably supported using the step sections 111 of the fastener feeding passage 110, the connecting sheets 103 and 104 are cut and separated securely at the connecting sections 108 of the connecting sheets 103 and 104 in which stress concentration is apt to occur. Furthermore, the attitude of the first fastener 1p is stably held using the shaft guide 102 in the up and down direction. As a result, the fastener 1p does not tilt inside the nose section 105.

When the fastener 101 reaches the injection nose section of a fastener driving tool or the like and is driven using the driver 109, the attitude of the fastener 101 is controlled so as to be parallel with the axis of the nose section using the shaft guide 102. Hence, the finish after driving can be made excellent, and the load for driving can be reduced since fasteners, such as nails and pins, are driven straight.

Figure 8:
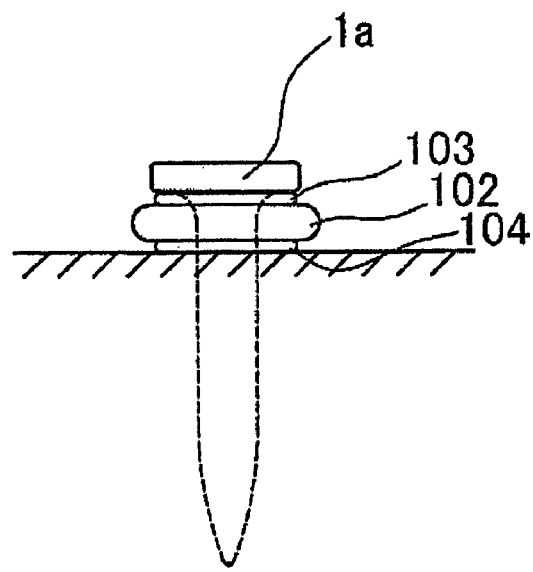
FIG. 8 is an explanatory view showing a fastener after driving.

The fastener 101 is usually a concrete pin. When the concrete pin is driven into concrete, the shaft guide 102 and the connecting sheets 103 and 104 separated from the shaft guide 102 are integrated and remain compressed between the head section 1a and the surface of the concrete as shown in FIG. 8. As a result, the broken pieces of the connecting sheets 103 and 104 and the shaft guides 102 are prevented from scattering and contaminating work areas. Furthermore, since the shaft guides 102 and the connecting sheets 103 and 104, having been compressed, are made of synthetic resins, they are positioned between the lower face of the head section of the concrete pin and the surface of the concrete in a compressed and close contact state, thereby having the function of a washer and being capable of effectively preventing rain water or the like from entering the pin holes in the concrete.

Moreover, although the connecting sections 108 of the connecting sheets 103 and 104 are formed at both ends of the slot 107, one connecting section at each end, the present invention is not limited to this configuration. For example, a perforated line may also be formed. Furthermore, it may also possible that grooves are formed at constant intervals in the width direction of the connecting sheets 103 and 104 and the groove portions are thin-walled so as to be cut off easily. Moreover, since the connecting sheets 103 and 104 are separate from the shaft guides 102, the breakable material of the connecting sheets 103 and 104 can be selected more easily than the material of the conventional integrated connecting band.

Figure 9:
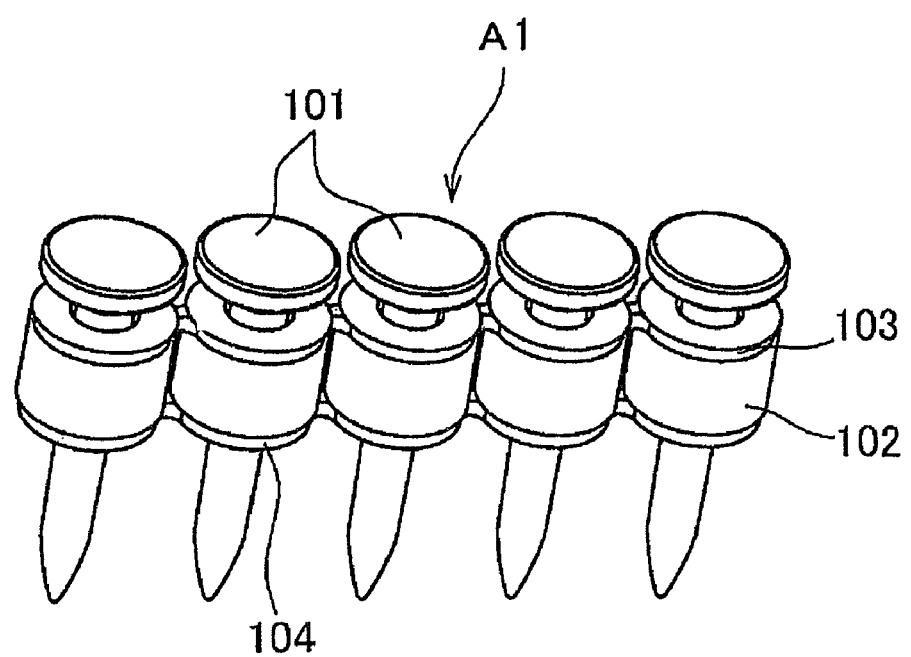
FIG. 9 is a perspective view showing a connected fastener assembly according to another embodiment of the present invention.
Figure 10:
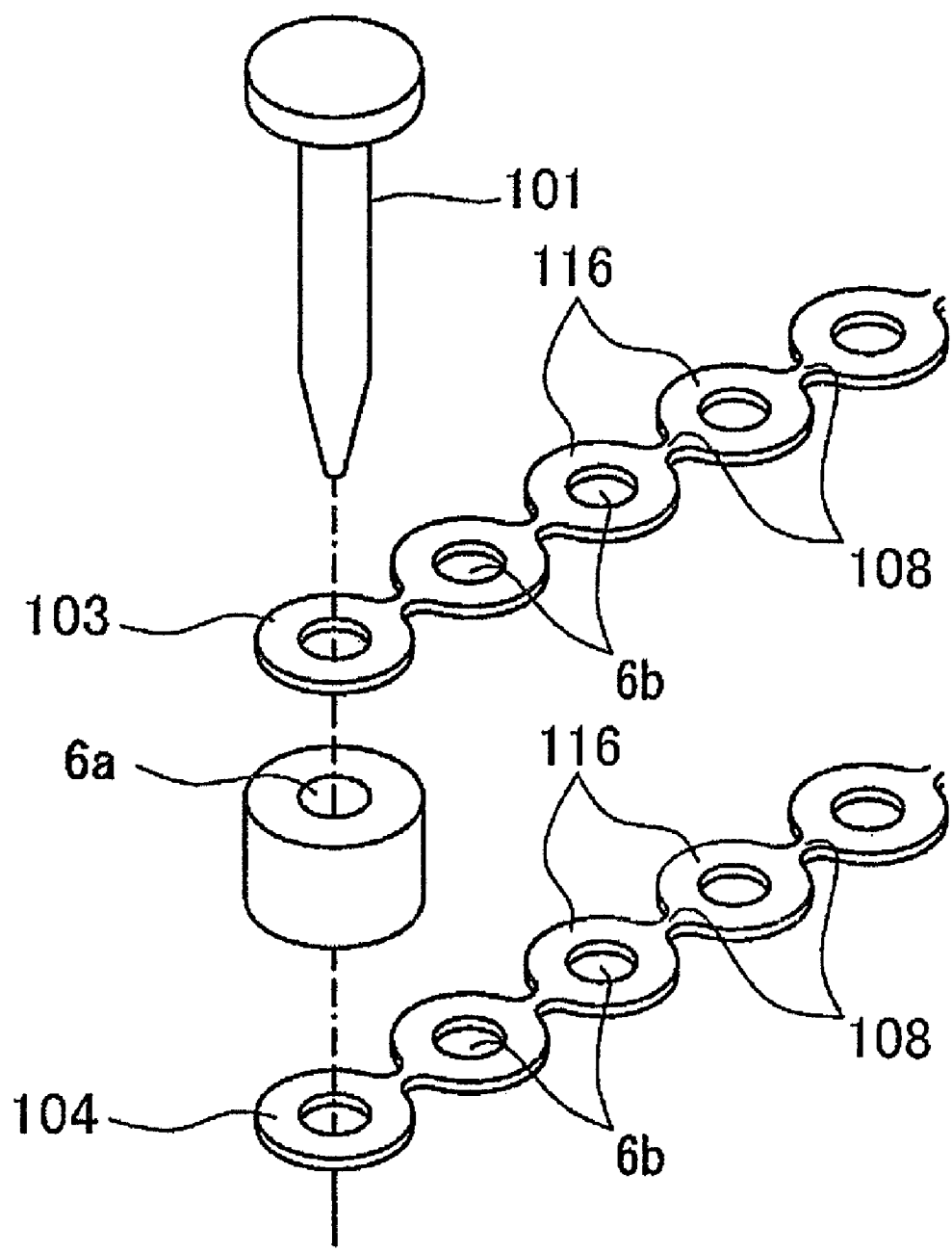
FIG. 10 is an exploded perspective view showing part of the connected fastener assembly.

Next, FIGS. 9 and 10 show another embodiment of the connecting sheets 103 and 104 for connecting the fasteners 101. In the connecting sheets 103 and 104, circular sections 116 having the same outside diameter as that of the shaft guides 102 are formed, and connecting sections 108, each being used to connect the adjacent circular sections 116, are made narrow in width and formed along the connecting direction of the fasteners 101. Hence, the connecting sheets 103 and 104 have a structure easy to bend in the width direction.

Figure 11:
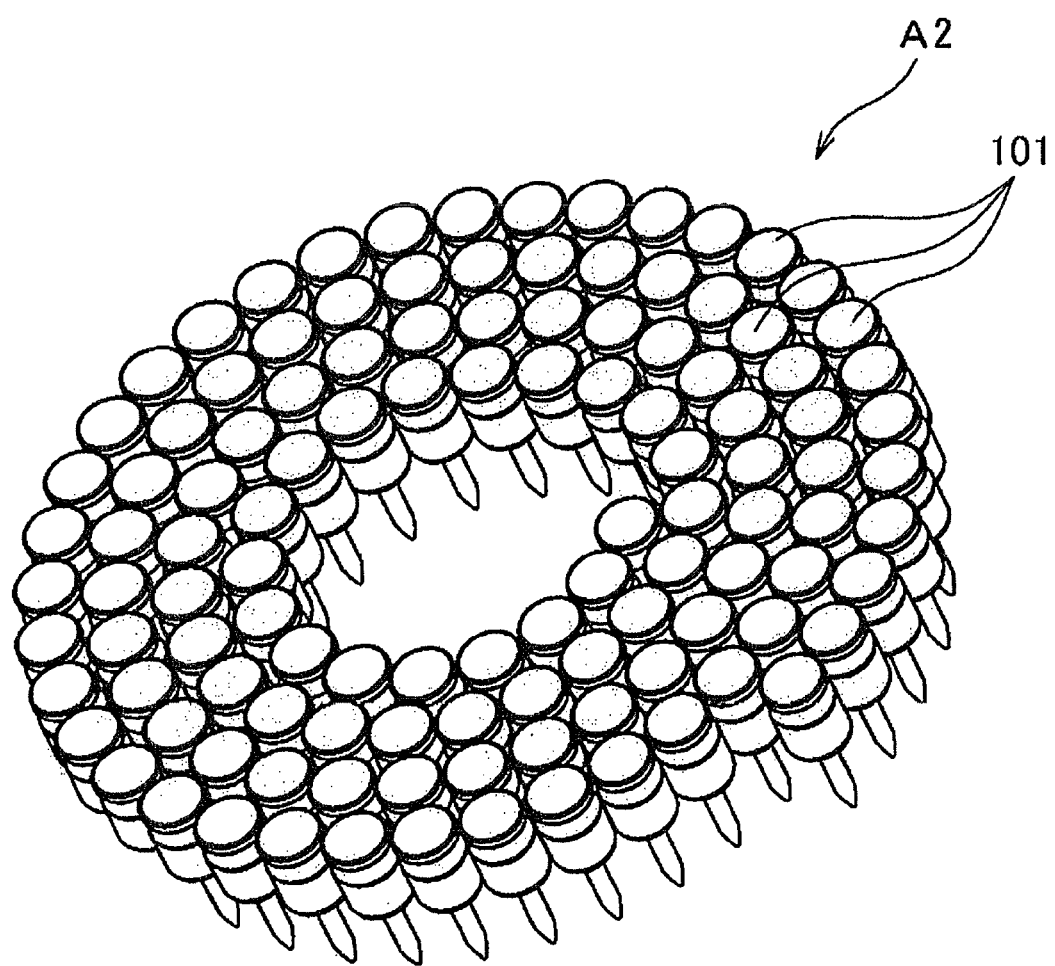
FIG. 11 is a perspective view showing the connected fastener assembly wound into a coil.

When the fasteners 101 are connected, the through holes 6b of the connecting sheets 103 and 104 are aligned with the through holes 6a of the shaft guides 102, and the shaft sections 1b are press-fitted into the through holes 6a and 6b as in the case of the straight type described above. Hence, the fasteners 101 are connected via the connecting sheets 103 and 104. In addition, since the connecting section 108 disposed between the adjacent fasteners 101 is formed so as to be narrow in width and fairly long in length, the connecting sheets 103 and 104 have a structure easy to bend in the width direction. Hence, the connected fastener assembly A1 can be bent in a direction orthogonal to the connecting direction and formed into a coil, whereby a coil-type connected fastener assembly A2 can be produced as shown in FIG. 11. Since the connecting sheet 103 is disposed on an upper side of the shaft guides 102 and the connecting sheet 104 is disposed on a lower side of the shaft guides 102, the connected fastener assembly A2 is provided with rigidity and can be wound into a coil.

Furthermore, when the connected fastener assembly A2 having the above-mentioned configuration is used, the connected fastener assembly A2 can be used in a manner similar to that of the embodiment described earlier with respect to the feeding of the fasteners, the supporting of the fasteners inside the fastener feeding passage 110, the stable holding of the fastener inside the nose section, the secure breakage and separation at the connecting section at the time of driving, the material of the shaft guide 102 and the changeability of the material of the shaft guide 102, except that the connected fastener assembly A2 is wound into a coil and loaded into a cylindrical magazine.

Figure 12:
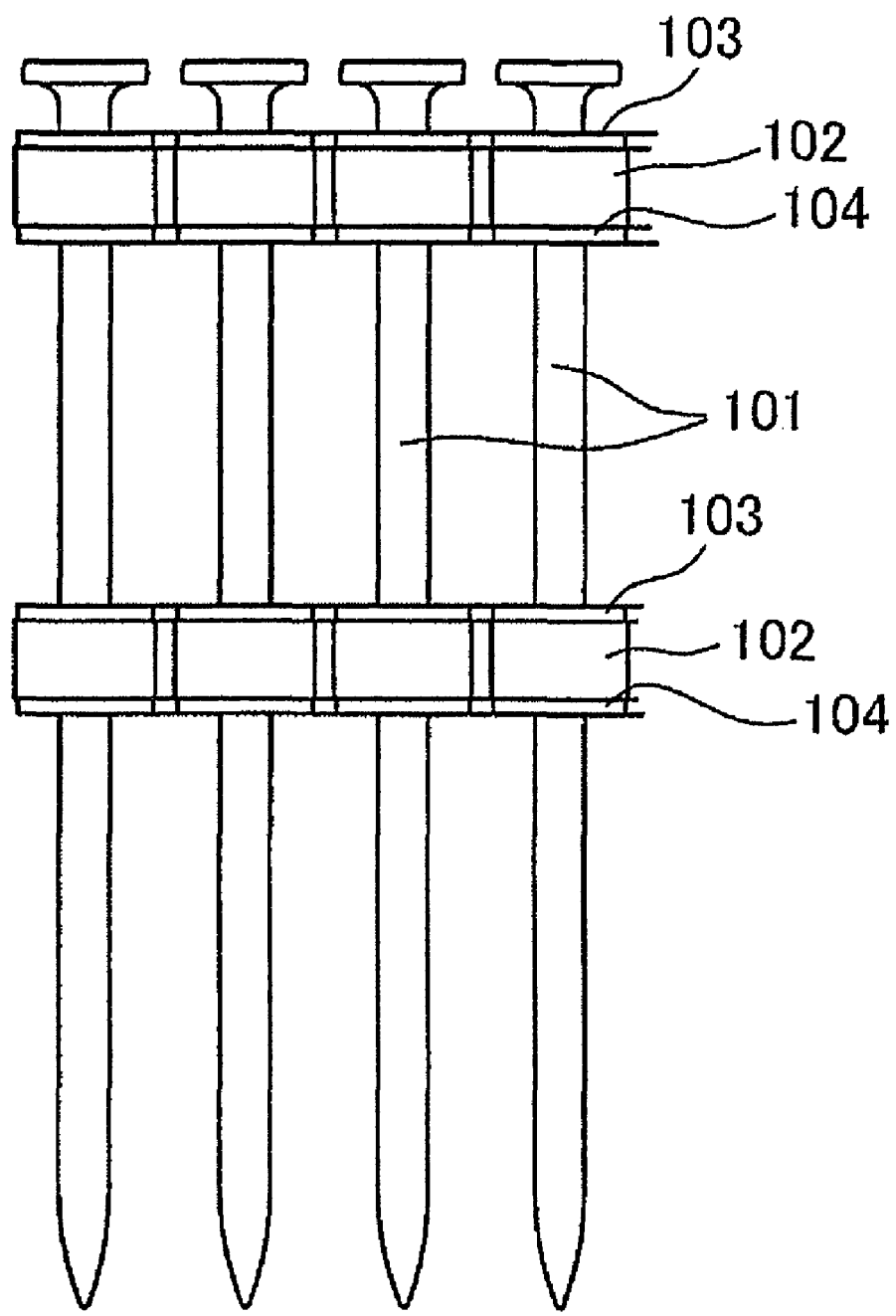
FIG. 12 is a side view showing the connection configuration of fasteners having long shafts.

In the case of a long fastener 101 having a long shaft length, the connection configuration comprising the shaft guide 102 and the connecting sheets 103 and 104 should only be provided at the upper and lower portions of the fastener 101 as shown in FIG. 12. Furthermore, in the case that short fasteners are connected, the height of the shaft guide 102 should only be reduced.

Figure 13:
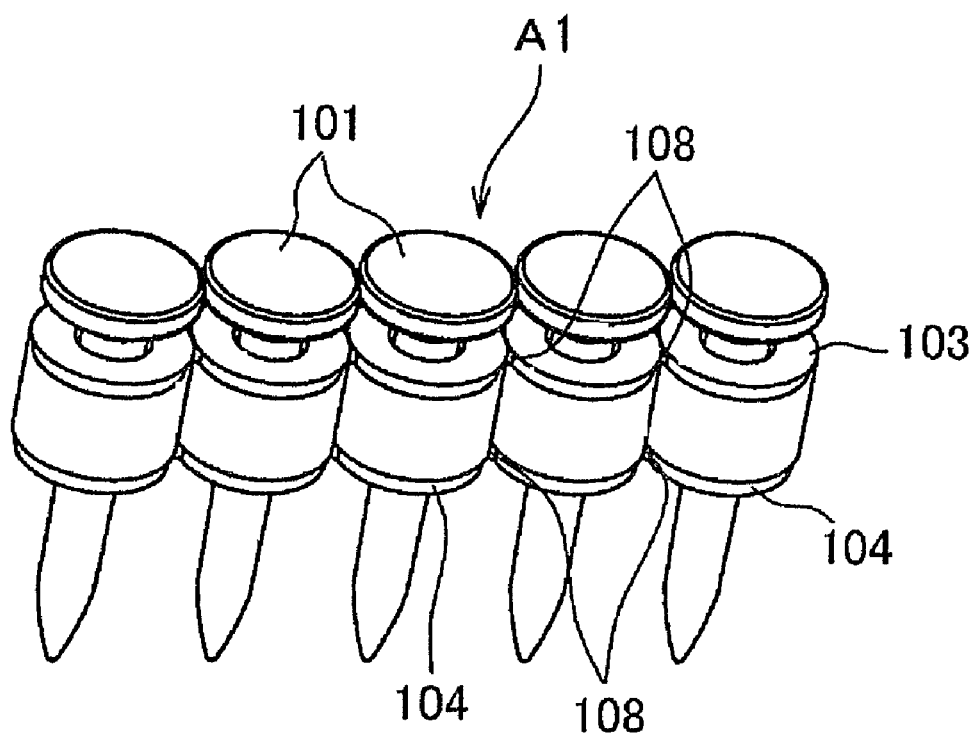
FIG. 13 is a perspective view showing a straight-type connected fastener assembly.

Moreover, in the case that the connecting sections 108 of the connecting sheets 103 and 104 are shortened, since the connecting sheets 103 and 104 have a structure difficult to bend in the width direction, it is possible to configure such a straight-type connected fastener assembly A1 as shown in FIG. 13.

With the above-mentioned connection configuration, since the connecting sheet 103 is disposed on an upper side of the shaft guides 102 and the connecting sheet 104 is disposed on a lower side of the shaft guides 102, the entire rigidity of the connected fastener assembly is improved, and high connection strength can be obtained securely. Furthermore, since the fasteners 101 are inserted into the shaft guides 102 and arranged properly, shaft tangling or the like does not occur.

Moreover, since the shape of the shaft guide 102 is simpler than the shaft guide according to the prior art and it is not necessary to connect the adjacent shaft guides 102 to each other in the stage of molding, it is not particularly necessary to provide fragile portions, whereby the shaft guides 102 can be obtained by cutting off a long tube formed by extrusion molding. The connecting sheets 103 and 104 can also be produced simply by press working. Since the shapes of the components are simple as described above, the components can also be molded easily. Hence, the production cost of the connected fastener assembly can be reduced.

Moreover, the straight-type connected fastener assembly A1 or the coil-type connected fastener assembly A2 can be produced by simply changing the connecting sheets 103 and 104. Still further, even in the case of fasteners 101 of various sizes, connected fastener assemblies can be produced without changing production facilities by simply adjusting the thickness and the inside diameter of the shaft guide 102 and the width of the connecting sheets 103 and 104 depending on the shaft length and diameter of the fastener 101. Hence, the connected fastener assemblies A1 and A2 of different types can be produced using the same production facilities of the same factory, regardless of the connection method and the connection configuration of the fasteners. As a result, the productivity can be improved, and the production cost of the connected fastener assembly can be reduced remarkably.

In addition, since the shaft guide 102 and the connecting sheets 103 and 104 are all simple in shape and can be improved in strength easily depending on the usage conditions and the shaft guides 102 and the connecting sheets 103 and 104 are formed as separate components, no load is directly applied to the shaft guides 102 of the adjacent fasteners 101. Hence, breakage hardly occurs in the connecting bands.

Furthermore, with the connection configuration described above, the height of the shaft guide 102 can be changed depending on the shaft length of the fastener, whereby short fasteners 101 can also be connected similarly. Moreover, the shaft guide 102 may also be made of a material that is easy to break upon impact. In this case, the shaft guide 102 breaks and scatters when the fastener 101 is driven. Conventionally, small nails, ornamental nails, etc. being used for the production of coffins, family alters, etc. are obliged to be driven by hand because of their short lengths and cannot be connected because of their short lengths. However, with the connection configuration described above, even such fasteners as having short lengths can be connected. Still further, since the shaft guide 102 is made of a material which scatters upon impact at the time of driving, the state of the nails after driven into coffins, family alters, etc. is superb, and the finish after driving is excellent.

Figure 14:
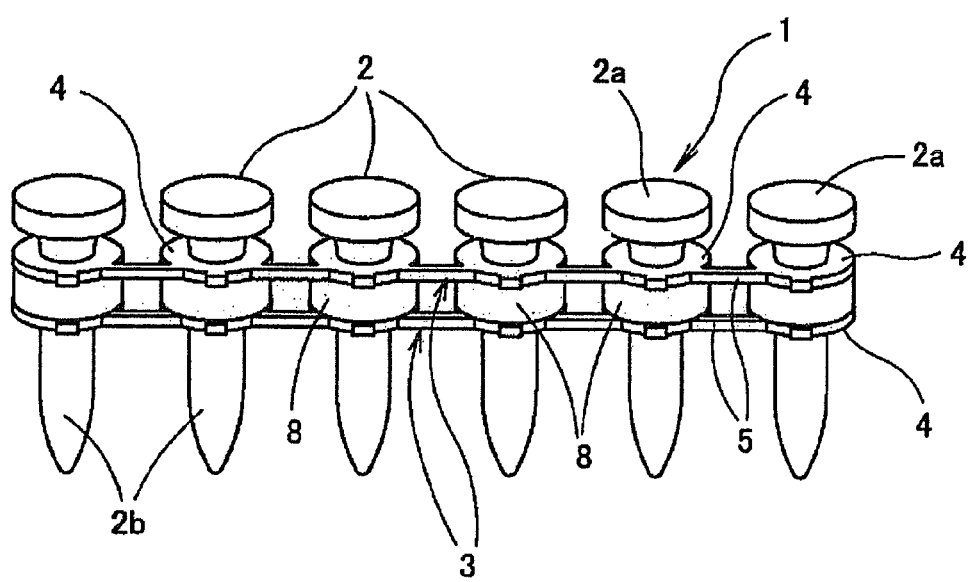
FIG. 14 is a perspective view showing part of a connected fastener assembly according to an embodiment of the present invention.
Figure 15A:
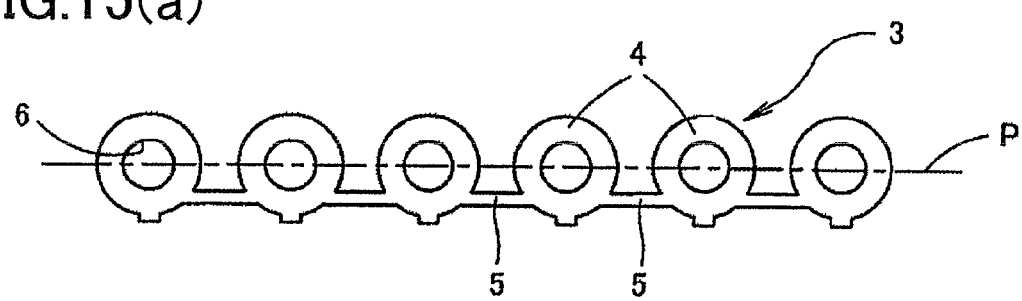
FIG. 15(a) is a plan view showing the connecting band of the connected fastener assembly.
Figure 15B:
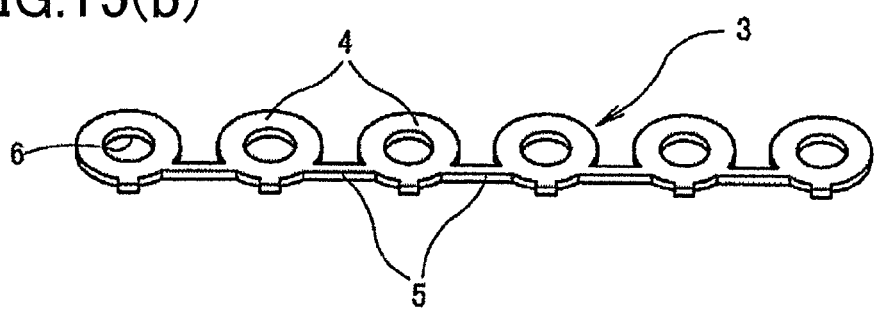
FIG. 15(b) is a perspective view showing the connecting band.

In FIG. 14, numeral 1 designates a connected fastener assembly. This connected fastener assembly 1 is formed by connecting the shaft sections 2b of multiple fasteners 2 (concrete pins) using connecting bands 3. The connecting band 3 is obtained, by press molding a band-shaped thin sheet made of a synthetic resin, such as polyethylene, wherein a ring-shaped retaining section 4 for allowing the shaft section 2b of the fastener 2 to be inserted and a connecting section 5 for connecting the adjacent ring-shaped retaining sections 4 are formed continuously as shown in FIGS. 15(a) and 15(b).

The ring-shaped retaining section 4 is circular in outer shape and is formed to have the same size as that of the head section 2a of the fastener 2. A fitting hole 6 for allowing the shaft section 2b of the fastener 2 to be fitted therein is formed at the center portion of the ring-shaped retaining section 4.

The connecting section 5 is used to connect the adjacent ring-shaped retaining sections 4 and to retain the distance between the adjacent ring-shaped retaining sections 4. The connecting section 5 is provided at a position offset from the center line P connecting the centers of the adjacent fasteners 2 (or shaft guides).

Numeral 8 designates a shaft guide. This shaft guide 8 is a slightly soft cylindrical member made of a synthetic resin or rubber, and its outside diameter is smaller than that of the ring-shaped retaining section 4 of the connecting band 3. The shaft guide 8 is fitted on the shaft section 2b of the fastener 2, and the ring-shaped retaining section 4 of the connecting band 3 is disposed on each of the upper and lower sides of the shaft guide 8.

Figure 16:
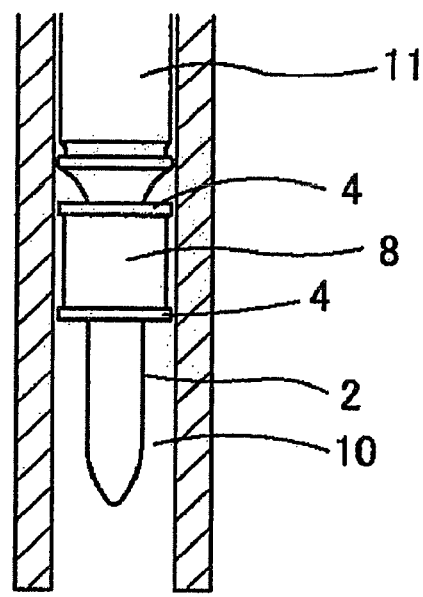
FIG. 16 is a sectional view showing the injection section of a fastener driving tool.

As shown in FIG. 16, the outside diameter of the ring-shaped retaining section 4 is approximately the same as the inside diameter of the cylindrical injection section 10 of a fastener driving tool, and the outside diameter of the shaft guide 8 is slightly smaller than the inside diameter of the injection section 10.

Figure 17:
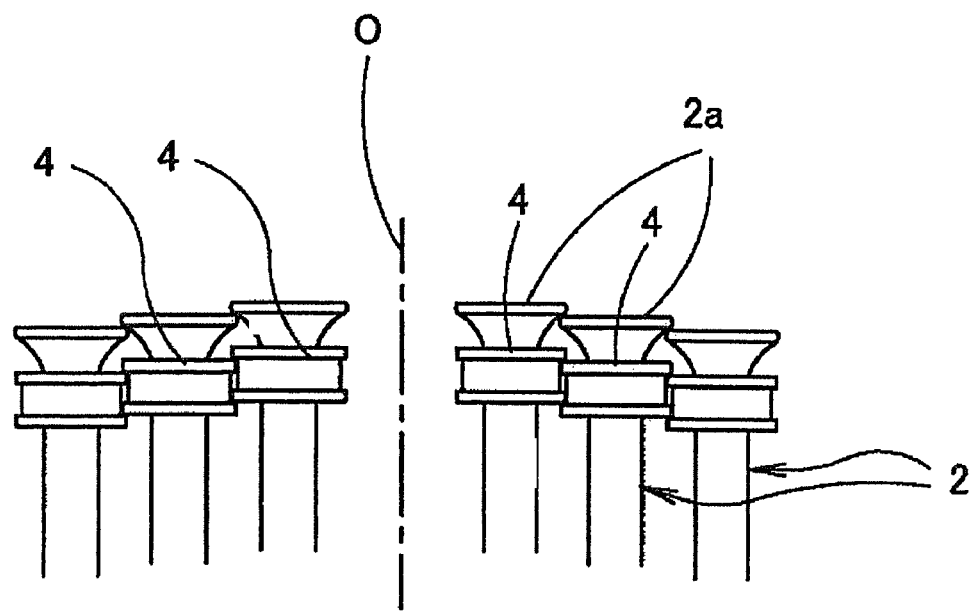
FIG. 17 is an explanatory view showing the connected fastener assembly wound into a coil, cross-sectioned in the diametric direction.

In the case that the connected fastener assembly 1 configured as described above is wound into a coil, when the winding is performed so that the head sections 2a of the fasteners 2 on the inner side make contact with those on the outer side, the density of the fasteners 2 becomes low. For the purpose of solving this problem, the connected fastener assembly 1 is wound so that the head section 2a of the fastener 2 on the outer side slightly enters below the head section 2a of the fastener 2 on the inner side as shown in FIG. 17. Hence, the coil is formed such that the center side becomes high and the outside becomes low. In this case, since the connected fastener assembly 1 is wound so that the head section 2a of the fastener 2 on the outer side slightly enters below the head section 2a of the fastener 2 on the inner side, the connecting band 3 is also wound so that the outer fringe of the ring-shaped retaining section 4 of the fastener 2 on the outer side slightly enters below the outer fringe of the ring-shaped retaining section 4 of the fastener 2 on the inner side and is overlapped therewith. Hence, when the coil is placed as a whole on a floor face or the like, the center portion 0 of the coil floats from the floor face or the like. However, since the ring-shaped retaining sections 4 of the connecting band 3 are overlapped with each other as described above, the fasteners 2 on the inner side are supported by the fasteners 2 on the outer side. Hence, the center side portion of the coil is supported by the outer side portion of the coil and does not drop. Therefore, when the connected fastener assembly 1 wound into a coil is lifted, the coil is not deformed.

Furthermore, when the first fastener 2 of the connected fastener assembly 1 is fed into the injection section 10 of a fastener driving tool and is impacted by its driver 11, the shaft guide 8 controls the fastener 2 so that the attitude of the fastener 2 does not tilt so much as shown in FIG. 16. Hence, the fastener 2 is guided by the shaft guide 8 without tilting significantly and driven into a workpiece securely.

Still further, although the ring-shaped retaining sections 4 and the shaft guide 8 are driven together with the fastener 2 when the fastener 2 is driven, since the ring-shaped retaining sections 4 and the shaft guide 8 are overlaid with the rear side of the head section 2a of the fastener 2 in a flattened state and is not exposed to the outside, the appearance of the fastener 2 after the driving is excellent.

In addition, since the connecting section 5 is provided at a position offset from the center line P connecting the centers of the adjacent fasteners 2, the length of the connecting section 5 is longer than that of the connecting section that is provided along the center line P although the distance between the ring-shaped retaining sections 4 is the same. In the case that the length of the connecting section 5 is long, the connecting section 5 can be bent at an acute angle. Hence, when the connecting band 3 is wound into a coil, the connecting sections 5 can be bent and the connecting band 3 can be wound so that the diameter of the coil at the start of winding on the center side of the coil becomes small, and the strength of the connecting sections 5 in the bent state is obtained securely. Besides, since the distance between the ring-shaped retaining sections 4 is not required to be lengthened, a sufficient quantity of the fasteners 2 can be connected as a whole. Furthermore, since the connecting section 5 is broken and the ring-shaped retaining sections 4 are held together with the shaft guide 8 between the head section 2a of the fastener 2 and the workpiece in a compressed state at the time of driving the fastener 2, the connecting section 5 and the ring-shaped retaining sections 4 are not scattered and do not produce garbage at the time of driving. Moreover, since the nose section of the fastener driving tool is not required to be provided with a hole for ejecting the connecting bands 3, the strength of the nose portion is not impaired.

Still further, when the connecting band 3 is wound into a coil, the connecting sections 5 are offset on the outer circumferential side of the coil. Hence, the bending radius of the connecting sections 5 when the connecting band 3 is begun to be wound into a coil is smaller than that in the case that the connecting sections 5 are offset on the opposite side. Therefore, the connecting band 3 having the connecting sections 5 can sufficiently meet conditions required for winding the connecting band 3 into a coil having a small diameter at the start of winding.

Figure 18:
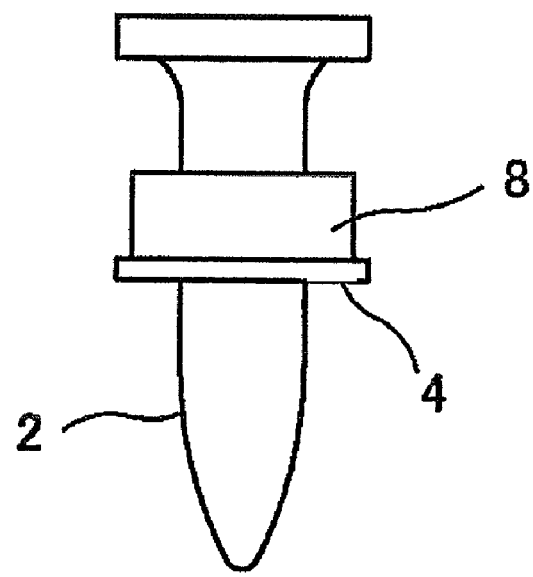
FIG. 18 is a front view showing a fastener according to another embodiment.
Figure 19:
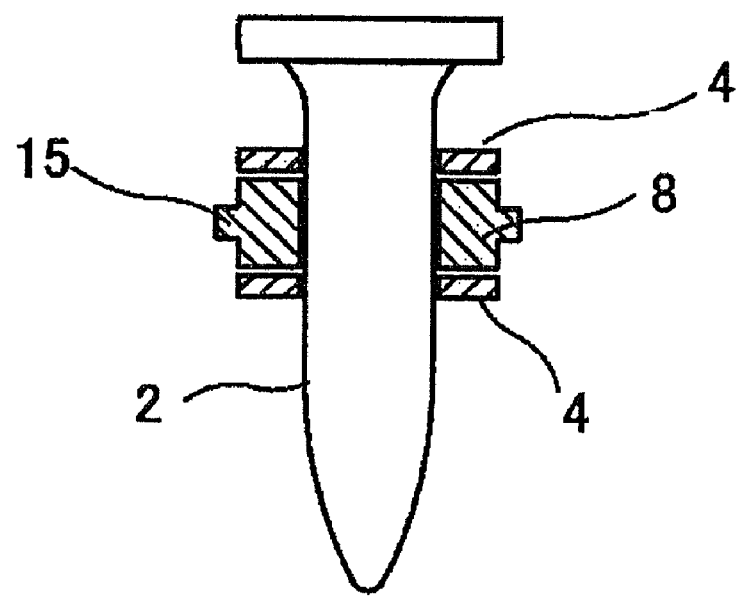
FIG. 19 is a front view showing a fastener according to still another embodiment, partly cross-sectioned.

The configuration in which the outside diameter of the ring-shaped retaining section 4 of the connecting band 3 is made larger than the outside diameter of the shaft guide 8 may be a configuration in which a single connecting band is used and the outside diameter of the ring-shaped retaining section 4 thereof is made larger than the outside diameter of the shaft guide 8 as shown in FIG. 18. Furthermore, the configuration may be a configuration in which an extending fringe 15 protruding outward is formed on the outer circumferential face of the shaft guide 8 as shown in FIG. 19. In these configurations, when the connected fastener assembly 1 is wound into a coil as shown in FIG. 17, the ring-shaped retaining section 4 or the extending fringe 15 of the shaft guide 8 of the fastener 2 on the inner circumferential side is partly overlapped with the ring-shaped retaining section 4 or the extending fringe 15 of the shaft guide 8 of the fastener 2 on the outer circumferential side in the up-down direction. Hence, when the whole coil is lifted, since part of the ring-shaped retaining section 4 or the extending fringe 15 on the inner circumferential side engages part of the ring-shaped retaining section 4 or the extending fringe 15 on the outer circumferential side and is supported thereby, the center side portion of the coil does not drop, and the connected fastener assembly 1 is maintained in the shape of a coil as a whole. As a result, the connected fastener assembly 1 can be stored and loaded smoothly.

Furthermore, another embodiment of the connection structure in which the center side of the coil hardly drops is shown in FIGS. 20(a) and 20(b). In the case of the fastener 2 shown in the figures, the outside diameter of the ring-shaped retaining section 4 of the connecting band 3 is approximately the same as the outside diameter the shaft guide 8, and engaging grooves 12 are formed on the outer circumferential face of the shaft guide 8 in the circumferential direction. The height of the engaging groove 12 is larger than the sum of the thickness of the outer fringe 13 above the engaging groove 12 and the thickness of the ring-shaped retaining section 4 and is also larger than the sum of the thickness of the outer fringe 14 below the engaging groove 12 and the thickness of the ring-shaped retaining section 4. It is preferable that the engaging grooves 12 should be formed at intervals on the circumferential face of the shaft guide 8.

Figure 21:
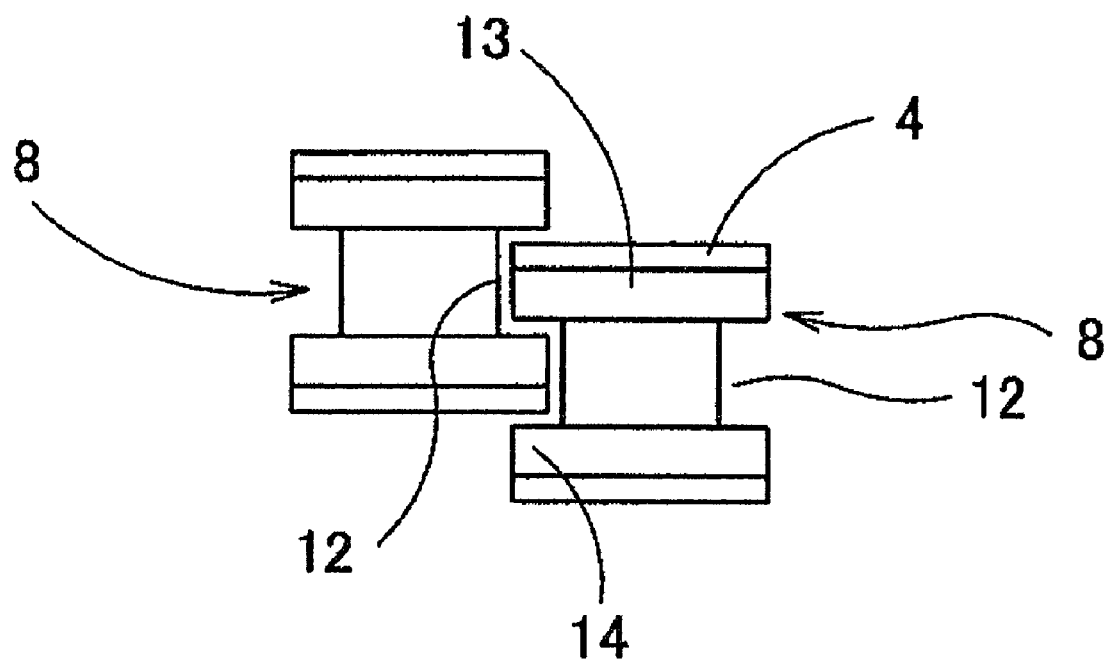
FIG. 21 is an explanatory view showing the relationship between a fastener on the inner circumferential side and a fastener on the outer circumferential side according to the above-mentioned embodiment.

In the configuration described above, when the connected fastener assembly 1 is wound into a coil, the outer fringe 13 above the engaging groove 12 of the shaft guide 8 and the ring-shaped retaining section 4 on the outer circumferential side engage the engaging groove 12 of the shaft guide 8 on the inner circumferential side as shown in FIG. 21. Hence, when the whole coil is lifted, since part of the shaft guide 8 on the inner circumferential side engages part of the shaft guide 8 on the outer circumferential side and is supported thereby, the center side portion of the coil does not drop, and the connected fastener assembly 1 is maintained in the shape of a coil as a whole.

Figure 22:
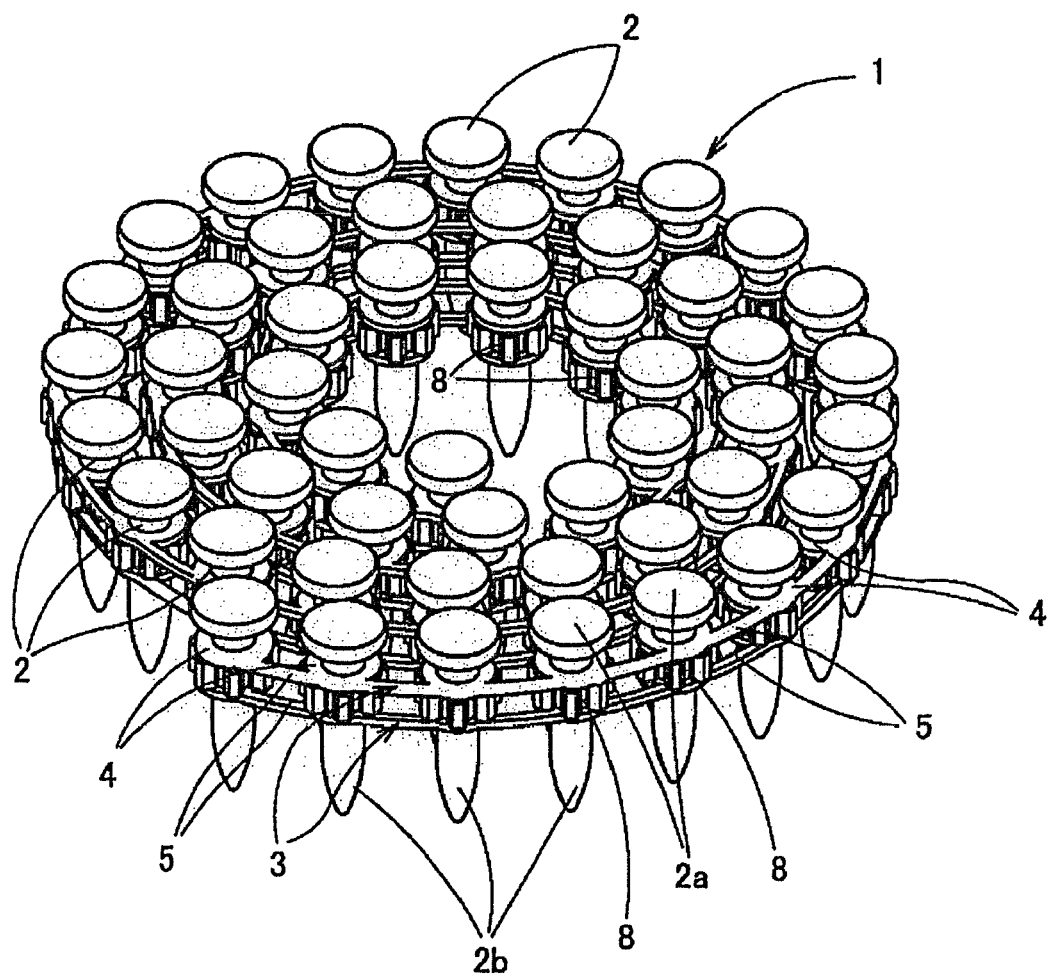
FIG. 22 is a perspective view showing a connected fastener assembly according to a further embodiment.

Moreover, a still another embodiment of the connection structure in which the center side of the coil hardly drops is shown in FIG. 22. The basic structure of the connected fastener assembly 1 according to this embodiment is the same as that of the connected fastener assembly 1 shown in FIG. 14 and other figures. The ring-shaped retaining sections 4 for retaining the shaft sections 2b of the fasteners 2 are formed at constant intervals in the connecting band 3. The ring-shaped retaining sections 4 are disposed on the upper and lower portions of the shaft guide 8 made of a soft material and fitted on the shaft section 2b of the fastener 2.

Figure 23B:
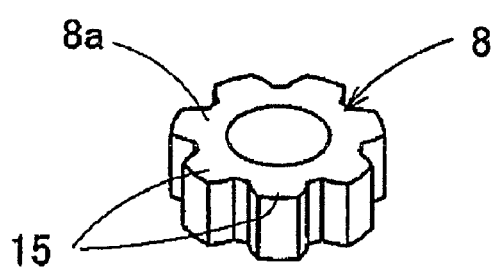
FIG. 23(a) is a perspective view showing a fastener and FIG. 23(b) is a perspective view showing a shaft guide according to the above-mentioned embodiment.
Figure 23A:
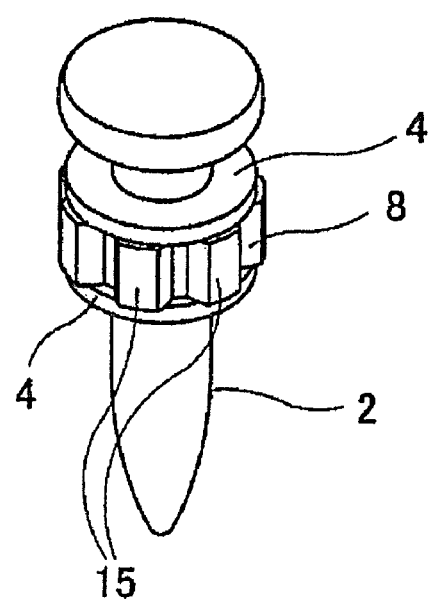

The above-mentioned shaft guide 8 is formed into the shape of a gear having a cylindrical body 8a and seven protrusions 15 formed on the outer circumferential face of cylindrical body 8a as shown in FIGS. 23(a) and 23(b). The outside diameter of the shaft guide 8 having the protrusions 15 is approximately the same as the outside diameter of the head section 2a of the fasteners 2. Furthermore, the outside diameter of the ring-shaped retaining section 4 of the connecting band 3 is larger than the outside diameter of the cylindrical body 8a and smaller than the outside diameter of the shaft guide 8 having the protrusions 15.

Figure 24A:
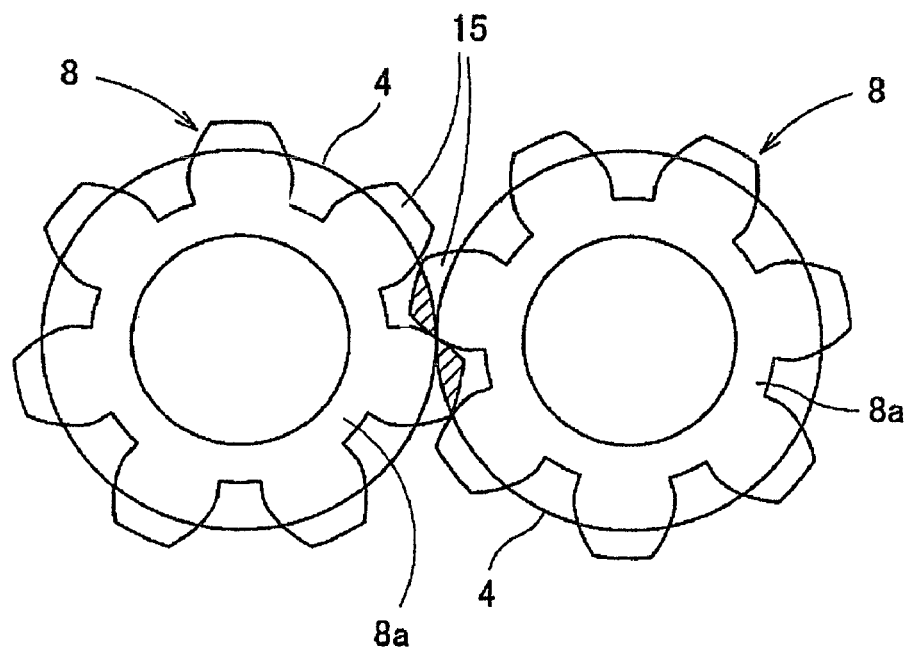
FIG. 24(a) is a plan view showing a ring-shaped retaining section and a shaft guide and FIG. 24(b) is a partly cross-sectioned side view showing the ring-shaped retaining section and the shaft guide according to the above-mentioned embodiment.
Figure 24B:
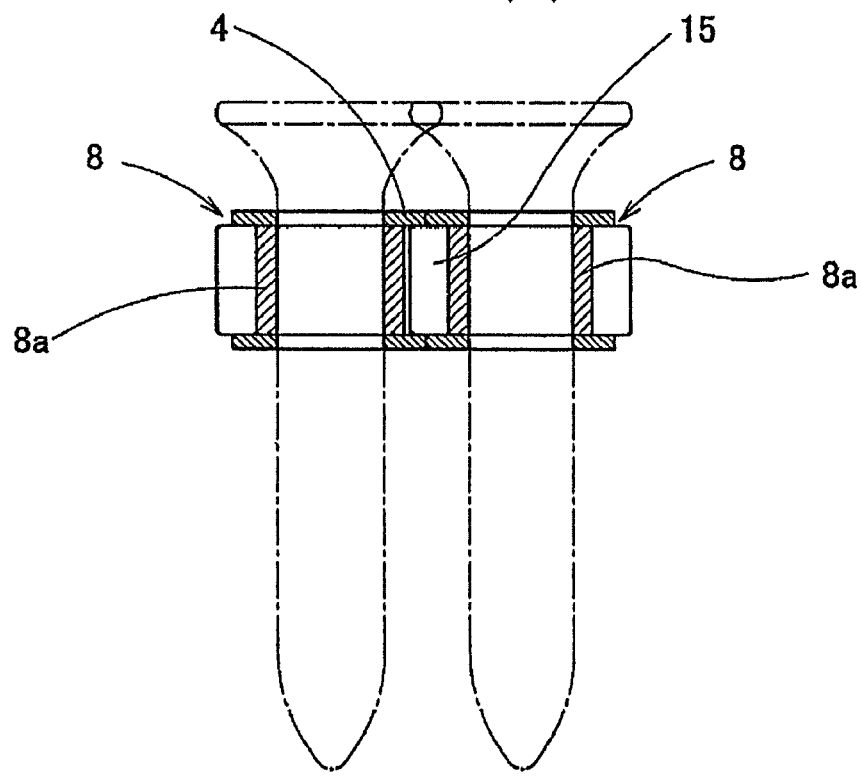

In the above-mentioned configuration, in the case that the connected fastener assembly 1 is wound into a coil, since the outside diameter of the ring-shaped retaining section 4 of the connecting band 3 is smaller than the outside diameter of the shaft guide 8 having the protrusions 15, when the cylindrical body 8a of the shaft guide 8 on the inner circumferential side comes close to the cylindrical body 8a of the shaft guide 8 on the outer circumferential side such that the protrusions 15 of the respective shaft guides 8 mesh with each other as shown in FIGS. 24(a) and 24(b), overlapping portions are formed in the up-down direction at the ring-shaped retaining section 4 disposed on the cylindrical body 8a on the inner circumferential side and at the ring-shaped retaining section 4 disposed on the cylindrical body 8a on the outer circumferential side. Hence, when the whole coil is lifted, since part of the ring-shaped retaining section 4 on the inner circumferential side engages part of the ring-shaped retaining section 4 on the outer circumferential side and is supported thereby, the center side portion of the coil does not drop, and the connected fastener assembly 1 is maintained in the shape of a coil as a whole. As a result, the connected fastener assembly 1 can be stored and loaded smoothly.

Furthermore, when the first fastener 2 is fed into the injection section of a fastener driving tool, since the outside diameter of the shaft guide 8 having the protrusions 15 is approximately the same as the outside diameter of the head section 2a of the fasteners 2, the shaft guide 8 is in a state of being fitted in the injection section, and the attitude of the fasteners 2 becomes stable and does not tilt, just as in the case shown in FIG. 16. Hence, when the fastener 2 is impacted by the driver of the driving tool, the shaft guide 8 properly controls the attitude of the fasteners 2. Hence, the fastener 2 is guided by the shaft guide 8 without tilting and driven into a workpiece accurately and securely.

At least three protrusions 15 should be formed on the outer circumferential face of the cylindrical body 8a of the shaft guide 8 in the circumferential direction. However, the shape of the shaft guide 8 is not limited to the shape of the gear shown in FIGS. 22 to 24. For example, the shaft guide 8 may be formed into such a polygonal shape as shown in FIGS. 25(a) and 25(b).

While the invention has been described in connection with the exemplary embodiments, it will be obvious to those skilled in the art that various changes and modifications may be made therein without departing form the present invention, and it is aimed, therefore, to cover in the appended claim all such changes and modifications as fall within the true spirit and scope of the present invention.

This application claims properties from Japanese Patent application filed on Nov. 6, 2008 (JP2007-288919) and Japanese Patent application filed on Nov. 6, 2008 (JP2007-288921), the contents of those are hereby incorporated by references.

INDUSTRIAL APPLICABILITY

The present invention is applicable to a connected fastener assembly for use in a fastener driving tool.

The invention claimed is:

1. A connected fastener assembly comprising:
 a plurality of fasteners;
 cylindrical shaft guides fitted on shaft sections of the respective fasteners;
 a connecting band formed of a thin sheet of a synthetic resin and connecting the shaft sections to each other; and
 ring-shaped retaining sections formed at constant intervals in the connecting band;
 wherein the ring-shaped retaining sections are disposed and overlaid on the shaft guides to retain the shaft sections, an outside diameter of each of the ring-shaped retaining sections of the connecting band is approximately the same as an outside diameter of each of the shaft guides, and
 wherein each shaft guide includes engaging grooves formed on an outer circumferential face of the shaft guide in the circumferential direction.

2. The connected fastener according to claim 1,
 wherein an extending fringe protruding outward is formed on the outer circumferential face of the shaft guides.

3. The connected fastener according to claim 1,
 wherein the shaft guides are made of soft materials,
 wherein each shaft guide includes at least three protrusions formed on the outer circumferential face of the shaft guide and protruding in the circumferential direction of the shaft guide.

\* \* \* \* \*